United States Patent
Kano

(10) Patent No.: US 11,546,786 B2
(45) Date of Patent: Jan. 3, 2023

(54) MOBILE TERMINAL TESTING DEVICE, MOBILE TERMINAL TESTING SYSTEM, AND NON-STANDALONE (NSA) TESTING METHOD

(71) Applicant: ANRITSU CORPORATION, Kanagawa (JP)

(72) Inventor: Daiki Kano, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/177,373

(22) Filed: Feb. 17, 2021

(65) Prior Publication Data

US 2021/0266766 A1 Aug. 26, 2021

(30) Foreign Application Priority Data

Feb. 20, 2020 (JP) .............................. JP2020-027263

(51) Int. Cl.
*H04W 24/08* (2009.01)
*H04L 5/00* (2006.01)
*H04W 24/10* (2009.01)

(52) U.S. Cl.
CPC ........... *H04W 24/08* (2013.01); *H04L 5/0048* (2013.01); *H04W 24/10* (2013.01)

(58) Field of Classification Search
CPC .... H04W 24/08; H04W 24/10; H04L 5/0048; H04L 5/005; H04L 5/0051
USPC ....................................................... 370/329
See application file for complete search history.

(56) References Cited

U.S. PATENT DOCUMENTS

| | | | | |
|---|---|---|---|---|
| 8,724,501 | B2 * | 5/2014 | Tanaka ................. | H04W 24/08 455/226.4 |
| 10,841,025 | B2 * | 11/2020 | Hammond ......... | H04B 17/3912 |
| 11,277,499 | B2 * | 3/2022 | Reynolds ............... | G06N 3/084 |
| 2012/0100813 | A1 * | 4/2012 | Mow ..................... | H04B 17/16 455/67.12 |
| 2012/0327796 | A1 * | 12/2012 | Ozaki .................. | H04W 24/06 370/252 |
| 2014/0323059 | A1 * | 10/2014 | Wakasa ................. | H04B 17/23 455/67.14 |
| 2015/0043356 | A1 | 2/2015 | Awano et al. | |

(Continued)

FOREIGN PATENT DOCUMENTS

| | | |
|---|---|---|
| JP | 2015-035689 A | 2/2015 |
| JP | 2016195356 A * | 11/2016 |
| WO | 2017-062244 A1 | 4/2017 |

*Primary Examiner* — Mong-Thuy T Tran
(74) *Attorney, Agent, or Firm* — Pearne & Gordon LLP

(57) ABSTRACT

A first mobile terminal testing device 1 including plurality of pseudo base station units 12-0, 12-1 operating as LTE base stations of NSA, and second mobile terminal testing device 2 operating as 5G NR base stations of NSA are provided. Each of the pseudo base station units 12-0, 12-1 is associated with the second mobile terminal testing devices 2, 2. The second mobile terminal testing device 2 generates a 5G NR control signal when testing a mobile terminal 3 which supports for NSA. The generated 5G NR control signal is transmitted to the first mobile terminal testing device 1. The first mobile terminal testing device 1 transmits the received 5G NR control signal to the mobile terminal 3 by the LTE control signal using the pseudo base station unit 12 corresponding to the second mobile terminal testing device 2 which transmits the control signal.

3 Claims, 3 Drawing Sheets

(56) References Cited

U.S. PATENT DOCUMENTS

| | | | |
|---|---|---|---|
| 2016/0149653 A1* | 5/2016 | El Gabbouch | H04B 17/17 |
| | | | 370/250 |
| 2016/0219449 A1* | 7/2016 | Tanaka | H04W 24/08 |
| 2016/0286422 A1* | 9/2016 | Samejima | H04B 17/0085 |
| 2017/0251460 A1* | 8/2017 | Agiwal | H04B 7/0617 |
| 2018/0343574 A1* | 11/2018 | Basedahl | G06F 11/3688 |
| 2018/0343575 A1* | 11/2018 | Ogawa | H04W 24/06 |
| 2018/0367230 A1 | 12/2018 | Su et al. | |
| 2019/0037424 A1* | 1/2019 | Shirasaki | H04L 5/001 |
| 2019/0053160 A1* | 2/2019 | He | H04W 52/0216 |
| 2019/0132064 A1* | 5/2019 | Rowell | H04B 17/18 |
| 2019/0166549 A1* | 5/2019 | Ahmavaara | H04W 76/16 |
| 2020/0169335 A1* | 5/2020 | Hosoya | H04B 17/10 |
| 2021/0153245 A1* | 5/2021 | Tooher | H04W 72/046 |

\* cited by examiner

MOBILE TERMINAL TESTING DEVICE, MOBILE TERMINAL TESTING SYSTEM, AND NON-STANDALONE (NSA) TESTING METHOD

TECHNICAL FIELD

The present invention relates to a mobile terminal testing device that performs a test on a mobile terminal.

BACKGROUND ART

When a mobile terminal, such as a mobile phone or a data communication terminal, which performs communication while moving, is developed, it is necessary to test whether or not the developed mobile terminal can normally perform communication. Therefore, a mobile terminal to be tested is connected to a testing device, which operates as a pseudo base station for simulating a function of an actual base station, and communication is performed between the testing device and the mobile terminal, thereby performing a test to confirm content of the communication.

In addition, in a mobile communication system, formulation of standard specifications for 5-th Generation New Radio (5G NR), which is a 5G wireless method, is completed.

In 5G NR, 5G lines are specialized for User plane (U-Plane: user data signal), and Control Plane (C-Plane: control signal for communication) is specified with specifications of Non-Standalone (NSA), in which transmission and reception are performed using Long Term Evolution (LTE) lines, and SA (Stand Alone) in which an operation is independently performed with 5G NR without being in cooperation with LTE.

Patent Document 1 discloses handover in a communication system for NSA and SA.

RELATED ART DOCUMENT

Patent Document

[Patent Document 1] WO2017/062244

DISCLOSURE OF THE INVENTION

Problem that the Invention is to Solve

When testing a mobile terminal which supports NSA, it is conceivable to perform the test by cooperatively using a mobile terminal testing device which supports a test in LTE and a mobile terminal testing device which supports a test in 5G NR.

However, in a case of such a configuration, when a test, such as handover, for simulating a plurality of base stations is performed, it is necessary to prepare two devices, respectively, for the mobile terminal testing device which supports the test in LTE and the mobile terminal testing device which supports the test in 5G NR, and thus configurations of the testing devices increase.

Therefore, an object of the present invention is to provide a mobile terminal testing device capable of suppressing a testing configuration to be small when a mobile terminal, which supports NSA, is tested by simulating a plurality of base stations.

Means for Solving the Problem

According to the present invention, there is provided a mobile terminal testing device (1), which is capable of testing a mobile terminal (3) by simulating a base station for mobile communication, including:

a pseudo base station unit (12-0) that simulates the base station, in which the pseudo base station unit includes a control unit (15) that receives a control signal of a communication standard, which is not supported by the control unit, from another mobile terminal testing device, and transmits the control signal to the mobile terminal according to a communication standard, which is supported by the control unit, using the pseudo base station unit.

In addition, in the mobile terminal testing device according to another embodiment, the mobile terminal testing device is capable of testing a plurality of the mobile terminals (3) in parallel, and includes a plurality of the pseudo base station units (12-0, 12-1), and each of the pseudo base station units is associated with each of other cooperating mobile terminal testing devices (2, 2).

With the configuration, each of the pseudo base station units cooperates with a separate mobile terminal testing device, and the base station is simulated. Therefore, one mobile terminal testing device can simulate the base station in cooperation with a plurality of other mobile terminal testing devices, and a testing configuration can be suppressed to be small.

According to the present invention, there is provided a mobile terminal testing system, which is capable of testing a mobile terminal (3) by simulating a base station for mobile communication, the system including:

a pseudo base station unit (12-0) that simulates the base station, in which the pseudo base station unit includes a first mobile terminal testing device which includes a control unit (15) that receives a control signal of a communication standard, which is not supported by the control unit, and transmits the control signal to the mobile terminal according to a communication standard, which is supported by the control unit, using the pseudo base station unit, and a second mobile terminal testing device (2) which generates the control signal and transmits the control signal to the first mobile terminal testing device, and the first mobile terminal testing device and the second mobile terminal testing device are configured to be communicable.

In addition, in the mobile terminal testing system according to another embodiment, a plurality of the second mobile terminal testing devices are provided, a plurality of the pseudo base station units are provided, and each of the plurality of the pseudo base station units is associated with each of the plurality of the second mobile terminal testing devices.

With the configuration, each of the pseudo base station units cooperates with the second mobile terminal testing device, and the base station is simulated. Therefore, the mobile terminal testing device is configured to be communicable with the plurality of second mobile terminal testing devices, and thus one mobile terminal testing device can simulate the base station in cooperation with a plurality of other mobile terminal testing devices, and a testing configuration can be suppressed to be small.

Further, according to the present invention, there is provided an NSA testing method, which uses a mobile terminal testing device that operates as an LTE base station of NSA including a plurality of pseudo base station units operating as the LTE base stations, and a plurality of mobile terminal testing devices that operate as 5G NR base stations of NSA, the method including:

a step of associating each of the pseudo base station units with the mobile terminal testing devices operating as the 5G NR base stations;

the 5G NR control signal being generated by the mobile terminal testing devices that operate as the 5G NR base stations;

a step of transmitting the 5G NR control signal generated by the mobile terminal testing devices that operates as the 5G NR base stations to the mobile terminal testing devices that operates as the LTE base stations; and a step of transmitting the 5G NR control signal received by the mobile terminal testing device that operates as the LTE base station to the mobile terminal by an LTE control signal using the pseudo base station units corresponding to the mobile terminal testing devices that operate as the 5G NR base stations which transmit the 5G NR control signal.

With the configuration, each of the pseudo base station units, which operate as LTE base stations, cooperates with the mobile terminal testing device, which operates as a 5G NR base station, so that a base station of NSA is simulated. Therefore, the mobile terminal testing device that operates as one LTE base station can simulate the base station of NSA in cooperation with the mobile terminal testing device that operates as the plurality of 5G NR base stations, and a testing configuration can be suppressed to be small.

Advantage of the Invention

The present invention can provide a mobile terminal testing device capable of suppressing a testing configuration to be small when a mobile terminal, which supports NSA, is tested by simulating a plurality of base stations.

BEST MODE FOR CARRYING OUT THE INVENTION

Hereinafter, a mobile terminal testing system according to an embodiment of the present invention will be described in detail with reference to the accompanying drawings.

Figure 1:
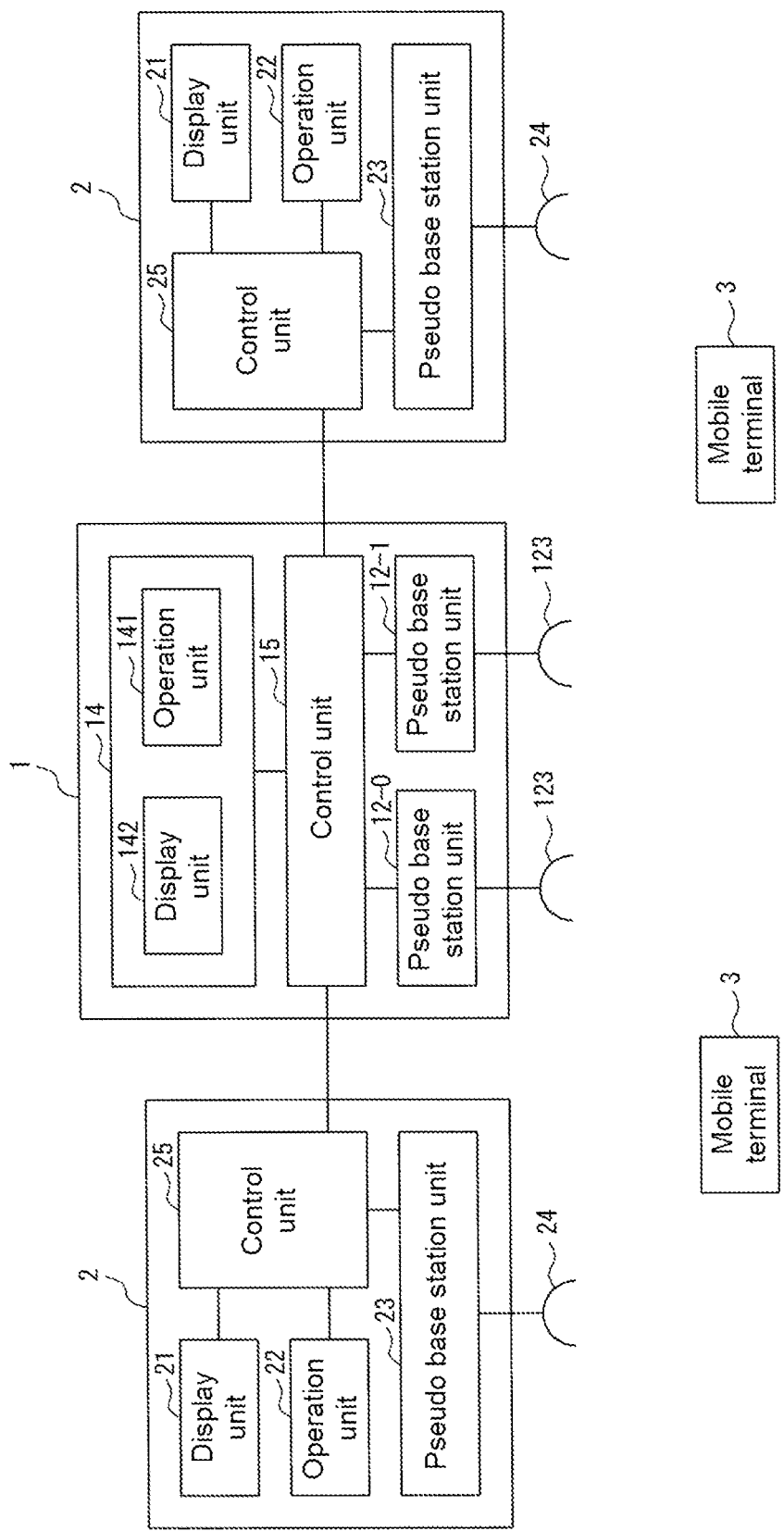
FIG. 1 is a block diagram illustrating a mobile terminal testing system according to an embodiment of the present invention.

In FIG. 1, the mobile terminal testing system according to the embodiment of the present invention includes a first mobile terminal testing device 1 and a second mobile terminal testing device 2.

The first mobile terminal testing device 1 and the second mobile terminal testing device 2 are testing devices for communication of different standards. For example, the first mobile terminal testing device 1 is configured to be dedicated to LTE standards, and the second mobile terminal testing device 2 is configured to be dedicated to 5G NR standard.

The mobile terminal testing system of the embodiment performs a test on a mobile terminal 3 configured to be capable of performing communication of a plurality of standards such as 5G NR and LTE.

In the embodiment, the first mobile terminal testing device 1 and the second mobile terminal testing device 2 wirelessly transmit and receive signals to and from the mobile terminal 3 via an antenna 123 and an antenna 24.

The first mobile terminal testing device 1 includes a built-in computer unit which has a Central Processing Unit (CPU), a Random Access Memory (RAM), a Read Only Memory (ROM), a flash memory, a hard disk device, an input port, and an output port.

In the computer unit, when the CPU executes an Operating System (OS) stored in the hard disk device, the CPU can control devices connected to the input port and the output port.

Figure 2:
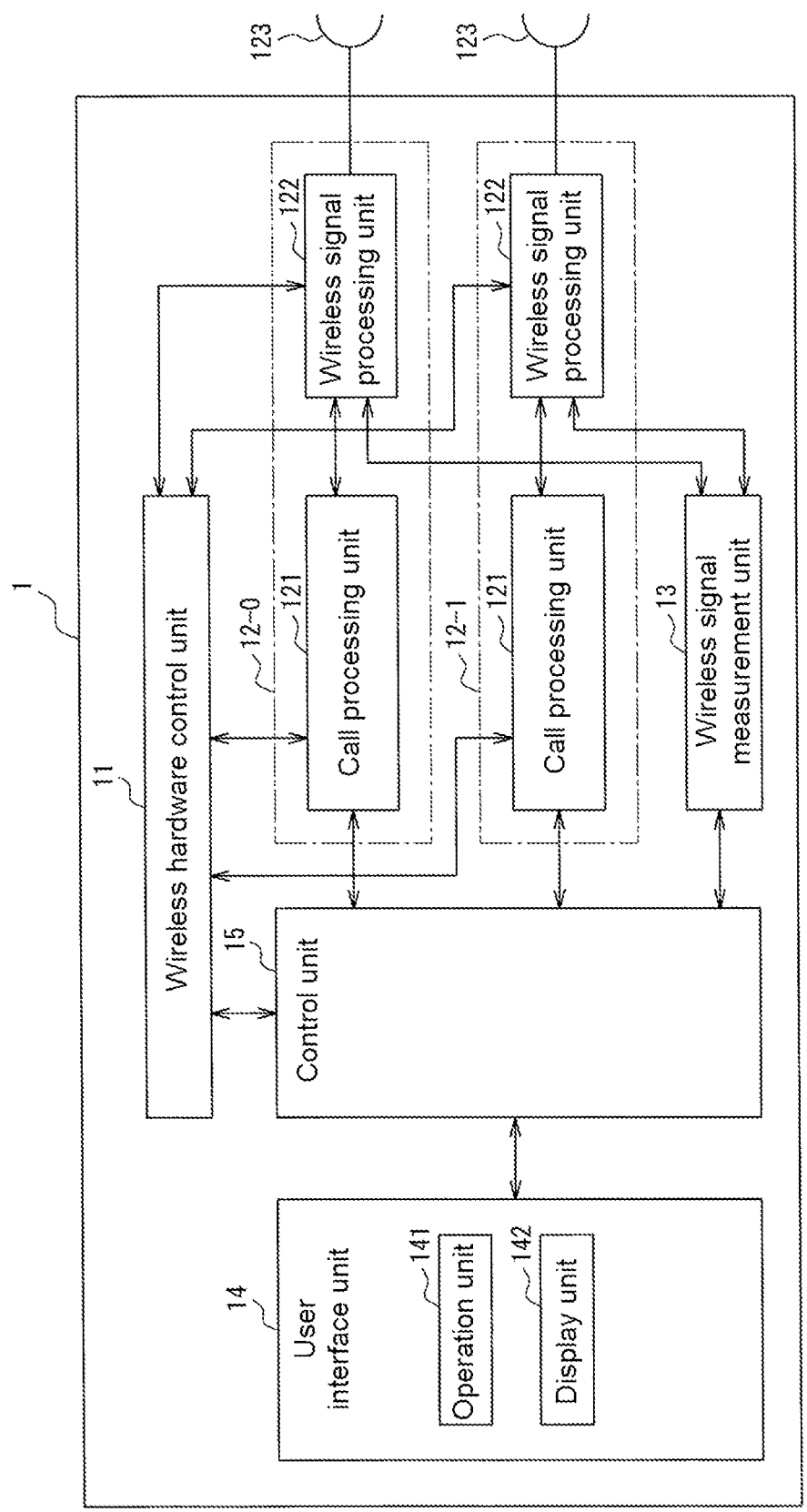
FIG. 2 is a block diagram illustrating a first mobile terminal testing device of the mobile terminal testing system according to the embodiment of the present invention.

As shown in FIG. 2, the first mobile terminal testing device 1 includes a wireless hardware control unit 11, two pseudo base station units 12-0, 12-1, a wireless signal measurement unit 13, a user interface unit 14, and a control unit 15. In the embodiment, although a case where two pseudo base station units 12 are included is illustrated, a larger number of pseudo base station units 12 may be included.

The wireless hardware control unit 11 controls a wireless signal processing unit 122 to control a transmission and reception level, a frequency, or the like of a wireless signal.

The pseudo base station units 12-0, 12-1 include each a call processing unit 121, a wireless signal processing unit 122, and an antenna 123.

The call processing unit 121 is connected to the wireless signal processing unit 122 and the wireless hardware control unit 11, transmits a setting signal to the wireless hardware control unit 11 according to a parameter, such as a frequency, which is set according to a test condition, and transmits a wireless signal which meets the test condition to the wireless signal processing unit 122. Further, the call processing unit 121 transmits and receives the wireless signal to and from the mobile terminal 3 via the wireless signal processing unit 122, thereby performing call connection, which meets the test condition, with the mobile terminal 3 or performing call control according to the test condition. Further, the call processing unit 121 transmits the setting signal to the wireless signal processing unit 122 according to the parameter of a set multiplexing method or the like, and transmits the wireless signal which meets the test condition to the wireless signal processing unit 122.

The wireless signal processing unit 122 transmits and receives the wireless signal to and from the mobile terminal 3 via the antenna 123. The wireless signal processing unit 122 performs encoding, modulation, frequency conversion, or the like on transmission data of the call processing unit 121, and generates and transmits the wireless signal. Further, the wireless signal processing unit 122 performs the frequency conversion, demodulation, decoding, or the like on the wireless signal received from the mobile terminal 3, and outputs the resulting wireless signal to the call processing unit 121.

The pseudo base station units 12-0, 12-1 can perform LTE communication with the mobile terminal 3 in conformity to the LTE standards.

The wireless signal measurement unit 13 is connected to the wireless signal processing unit 122, measures a transmission and reception level, throughput, or the like of the wireless signal transmitted and received by the wireless signal processing unit 122, and outputs a measurement result to the control unit 15. The control unit 15 stores the measurement result from the wireless signal measurement unit 13 in association with time information and the like in a hard disk or the like, displays and outputs the measurement result on the user interface unit 14 at the request of the user, or outputs the measurement result in a file as a log.

The user interface unit 14 includes an operation unit 141 that receives an operation input from the user, and a display unit 142 that displays a test parameter setting screen, the measurement result of the wireless signal measurement unit 13, and the like. The operation unit 141 includes a touch pad, a keyboard, push buttons, and the like. The display unit 142 includes a liquid crystal display device or the like.

The control unit 15 includes a program stored in the hard disk device of the first mobile terminal testing device 1. The control unit 15 operates on an OS of the first mobile terminal testing device 1, controls the wireless hardware control unit 11, the pseudo base station units 12-0, 12-1, the wireless signal measurement unit 13, and the user interface unit 14, and the like via the OS, and operates the computer unit as the first mobile terminal testing device 1.

The control unit 15 transmits the setting signal to the wireless hardware control unit 11 based on the parameter which is set according to the parameter setting screen displayed on the display unit 142, controls the frequency or the like of the wireless signal transmitted and received by the wireless signal processing unit 122, and causes the wireless signal measurement unit 13 to perform the measurement. Further, the control unit 15 notifies the set parameter to the call processing unit 121, and establishes communication conforming to the set parameter.

Further, the control unit 15 transmits a signal to the wireless hardware control unit 11 and the call processing unit 121 according to an instruction which is input to the operation unit 141, and performs test call control and the like.

In FIG. 1, the second mobile terminal testing device 2 includes a computer unit which has a CPU, a RAM, a ROM, a flash memory, a hard disk device, an input port, and an output port.

In the computer unit, when the CPU executes the OS stored in the hard disk device, the CPU can control devices connected to the input port and the output port.

The second mobile terminal testing device 2 includes a display unit 21, an operation unit 22, a pseudo base station unit 23, an antenna 24, and a control unit 25.

The display unit 21 includes a liquid crystal display device or the like, and displays an image for inputting necessary information, an image representing a state under test, and the like.

The operation unit 22 includes input devices such as a keyboard, a mouse, and a touch panel, and outputs information, which is input through the operation, to the control unit 25.

The pseudo base station unit 23 transmits and receives the wireless signal to and from the mobile terminal 3 via the antenna 24 under the control of the control unit 25. The pseudo base station unit 23 controls communication with the mobile terminal 3 based on a command which is input from the control unit 25. The pseudo base station unit 23 outputs a state of the communication with the mobile terminal 3 to the control unit 25.

The pseudo base station unit 23 can perform 5G NR communication with the mobile terminal 3 in conformity to the 5G NR standard.

The control unit 25 includes a program stored in the hard disk device of the second mobile terminal testing device 2. The control unit 25 operates on an OS of the second mobile terminal testing device 2, controls the display unit 21, the operation unit 22, the pseudo base station unit 23, and the like via the OS, and operates the computer unit as the second mobile terminal testing device 2.

The control unit 25 outputs the command to the pseudo base station unit 23 based on the information which is input to the operation unit 22, and controls the operation as the pseudo base station. The control unit 25 displays, on the display unit 21, a guide for input to the operation unit 22, content of the parameter which is set in the pseudo base station unit 23, the state of communication, which is output from the pseudo base station unit 23, with the mobile terminal 3, and the like.

The control unit 15 of the first mobile terminal testing device 1 and the control unit 25 of the second mobile terminal testing device 2 are connected by a cable so that communication is possible with each other.

The first mobile terminal testing device 1 of the embodiment includes two pseudo base station units 12, and each of the two pseudo base station units 12-0, 12-1 can independently perform LTE communication. In the first mobile terminal testing device 1, each of the two pseudo base station units 12-0, 12-1 is associated with the second mobile terminal testing device 2, and cooperates with the associated second mobile terminal testing device 2 to simulate a base station pair of NSA.

That is, in the configuration illustrated in FIG. 1, for example, it is possible to simultaneously test two mobile terminals 3 which support NSA or to test handover between base stations which support NSA.

The first mobile terminal testing device 1 is associated with, for example, a connection port of a cable connected to the control unit 25 of the second mobile terminal testing device 2, and one of the pseudo base station units 12. In a case where a signal is received from the control unit 25 of the second mobile terminal testing device 2, the control unit 15 of the first mobile terminal testing device 1 transmits a signal corresponding to the received signal by the pseudo base station unit 12 corresponding to the connection port which receives the signal.

As described above, the first mobile terminal testing device 1 includes the two pseudo base station units 12, and each of the two pseudo base station units 12 can independently perform the LTE communication, so that each of the pseudo base station units 12 cooperates with a separate second mobile terminal testing device 2 to simulate the base stations of NSA.

Therefore, in a case where the mobile terminal 3 which supports NSA is tested by simulating a plurality of base stations, it is possible to suppress the testing configuration to be small.

In the mobile terminal testing system having the configuration, when the mobile terminal 3 which supports NSA is tested, the first mobile terminal testing device 1 is caused to create a test scenario, in which a parameter or a signal sequence as an LTE pseudo base station is set according to a test item for each of the two pseudo base station units 12-0, 12-1.

In addition, the second mobile terminal testing device 2 is caused to create a test scenario in which a parameter or a signal sequences as a 5G NR pseudo base station is set according to the test item. Here, a 5G NR control signal (hereinafter, also referred to as a signaling message) transmitted based on LTE C-Plane is also set by the test scenario of the second mobile terminal testing device 2.

The test scenario created as above is executed by the first mobile terminal testing device 1 and the second mobile terminal testing device 2.

In a case of a timing at which the 5G NR control signal is transmitted in the second mobile terminal testing device 2 while the test scenario is executed, the control unit 25 of the second mobile terminal testing device 2 generates a signaling message based on information set for the test scenario.

The control unit 25 notifies the generated signaling message to the control unit 15 of the first mobile terminal testing device 1.

When a 5G NR signaling message is received from the control unit 25 of the second mobile terminal testing device 2, the control unit 15 of the first mobile terminal testing device 1 transmits the received signaling message to the mobile terminal 3 by the LTE C-Plane in accordance with the LTE standard using the pseudo base station unit 12 corresponding to the connection port that receives the signaling message.

As above, in a case where the 5G NR signaling message is transmitted in the test of the mobile terminal 3 which supports NSA, the signaling message is created in the second mobile terminal testing device 2 in conformity to the 5G NR standard, and the signaling message is notified to the first mobile terminal testing device 1 in conformity to the LTE standard, and the first mobile terminal testing device 1 transmits the received signaling message without change.

Therefore, it is not necessary to generate the 5G NR signaling message in the first mobile terminal testing device 1, and processing loads can be reduced.

Further, since the first mobile terminal testing device 1 only transmits the received 5G NR signaling message to the mobile terminal 3 as it is, it is not necessary to perform change in the first mobile terminal testing device 1 even in a case where the 5G NR standard is changed.

Figure 3:
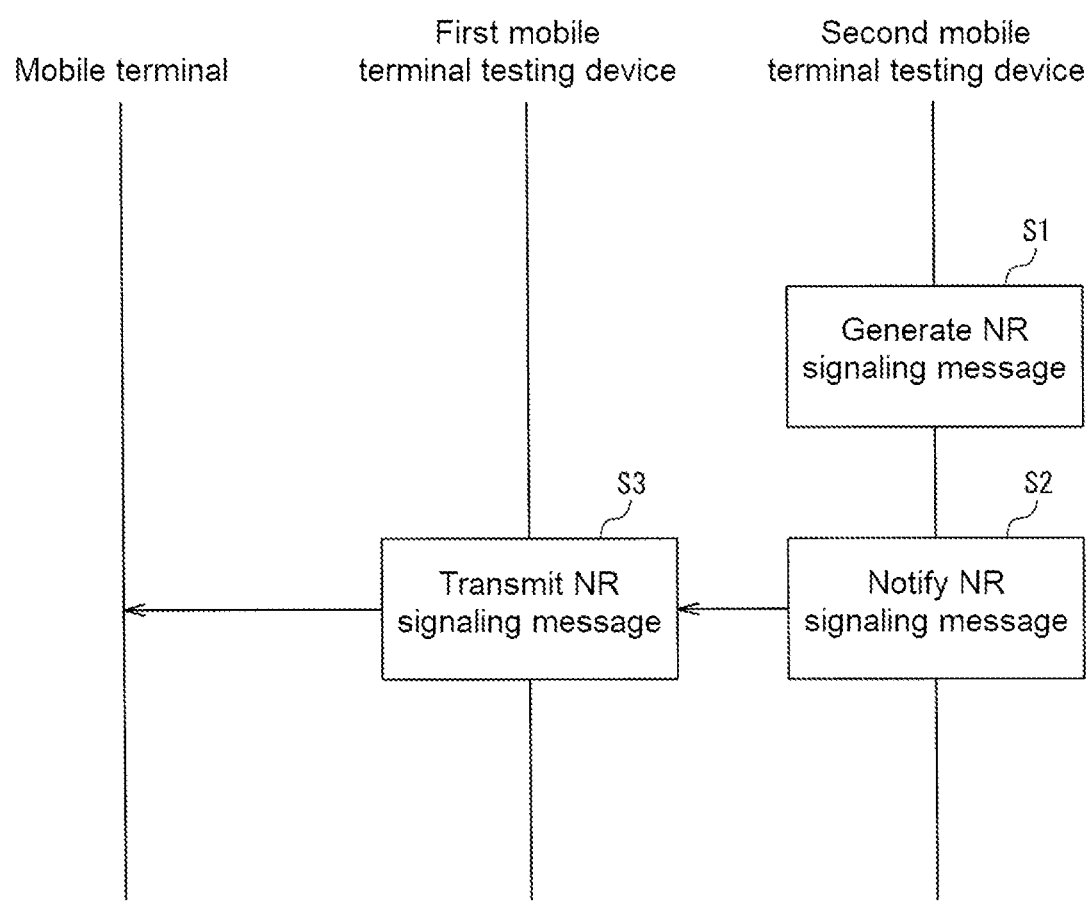
FIG. 3 is a sequence diagram illustrating a procedure for 5G NR signaling message transmission processing of the mobile terminal testing system according to the embodiment of the present invention.

5G NR signaling message transmission processing by the mobile terminal testing system configured as described above according to the embodiment will be described with reference to FIG. 3.

In a case of a timing to transmit the 5G NR control signal, the control unit 25 of the second mobile terminal testing device 2 generates a signaling message based on the information set for the test scenario in step S1.

In step S2, the control unit 25 notifies the generated signaling message to the control unit 15 of the first mobile terminal testing device 1.

In step S3, the control unit 15 of the first mobile terminal testing device 1 transmits the received signaling message to the mobile terminal 3 by the LTE C-Plane using the pseudo base station unit 12 corresponding to the connection port that receives the signaling message.

In the embodiment, although a case is represented where only a main body of the device is operated as the first mobile terminal testing device 1 and the second mobile terminal testing device 2, control may be performed by a personal computer device.

Although the embodiments of the present invention is disclosed, it is apparent that modifications can be made by those skilled in the art without departing from the scope of the invention. All such modifications and equivalents are intended to be included in the following claims.

DESCRIPTION OF REFERENCE NUMERALS AND SIGNS

1 first mobile terminal testing device (mobile terminal testing device)
2 second mobile terminal testing device (another mobile terminal testing device)
3 mobile terminal
12, 12-0, 12-1 pseudo base station unit
15 control unit
25 control unit

What is claimed is:

1. A mobile terminal testing device, which is capable of testing a mobile terminal by simulating a base station for mobile communication, comprising:
   a pseudo base station unit that simulates the base station, wherein the pseudo base station unit includes a control unit that receives a control signal of a communication standard, which is not supported by the control unit, from another mobile terminal testing device, and transmits the control signal to the mobile terminal according to a communication standard, which is supported by the control unit, using the pseudo base station unit,
   wherein the mobile terminal testing device is capable of testing a plurality of the mobile terminals in parallel, and includes a plurality of the pseudo base station units,
   wherein each of the pseudo base station units is associated with each of other cooperating mobile terminal testing devices,
   wherein the plurality of pseudo base station units operate as Long Term Evolution (LTE) base stations of Non-Standalone (NSA), and
   wherein the plurality of other mobile terminal testing devices operate as 5G New Radio (NR) base stations of NSA.

2. A mobile terminal testing system, which is capable of testing a mobile terminal by simulating a base station for mobile communication, the system comprising:
   a pseudo base station unit that simulates the base station, wherein the pseudo base station unit includes
     a first mobile terminal testing device which includes a control unit that receives a control signal of a communication standard, which is not supported by the control unit, and transmits the control signal to the mobile terminal according to a communication standard, which is supported by the control unit, using the pseudo base station unit, and
     a second mobile terminal testing device which generates the control signal and transmits the control signal to the first mobile terminal testing device,
   wherein the first mobile terminal testing device and the second mobile terminal testing device are configured to be communicable,
   wherein a plurality of the second mobile terminal testing devices are provided,
   wherein a plurality of the pseudo base station units are provided, and
   wherein each of the plurality of the pseudo base station units is associated with each of the plurality of the second mobile terminal testing devices,
   wherein the plurality of pseudo base station units operate as Long Term Evolution (LTE) base stations of Non-Standalone (NSA),
   wherein the first mobile terminal testing device operates as the LTE base station, and
   wherein the second mobile terminal testing device operates as a 5G New Radio (NR) base station of NSA and supports NSA.

3. A Non-Standalone (NSA) testing method, which uses a mobile terminal testing device that operates as an Long Term Evolution (LTE) base station of NSA including a plurality of pseudo base station units operating as the LTE base stations, and a plurality of mobile terminal testing devices that operate as 5G New Radio (NR) base stations of NSA, the method comprising:
- a step of associating each of the pseudo base station units with the mobile terminal testing devices operating as the 5G NR base stations;
- a step of generating a 5G NR control signal by the mobile terminal testing devices that operate as the 5G NR base stations;
- a step of transmitting the 5G NR control signal generated by the mobile terminal testing devices that operates as the 5G NR base stations to the mobile terminal testing devices that operates as the LTE base stations; and
- a step of transmitting the 5G NR control signal received by the mobile terminal testing device that operates as the LTE base station to a mobile terminal by an LTE control signal using the pseudo base station units corresponding to the mobile terminal testing devices that operate as the 5G NR base stations which transmit the 5G NR control signal.

* * * * *